May 22, 1962 H. W. EWERT 3,035,359
SNOW REMOVING ATTACHMENT FOR POWER MOWERS
Filed June 23, 1961 2 Sheets-Sheet 1
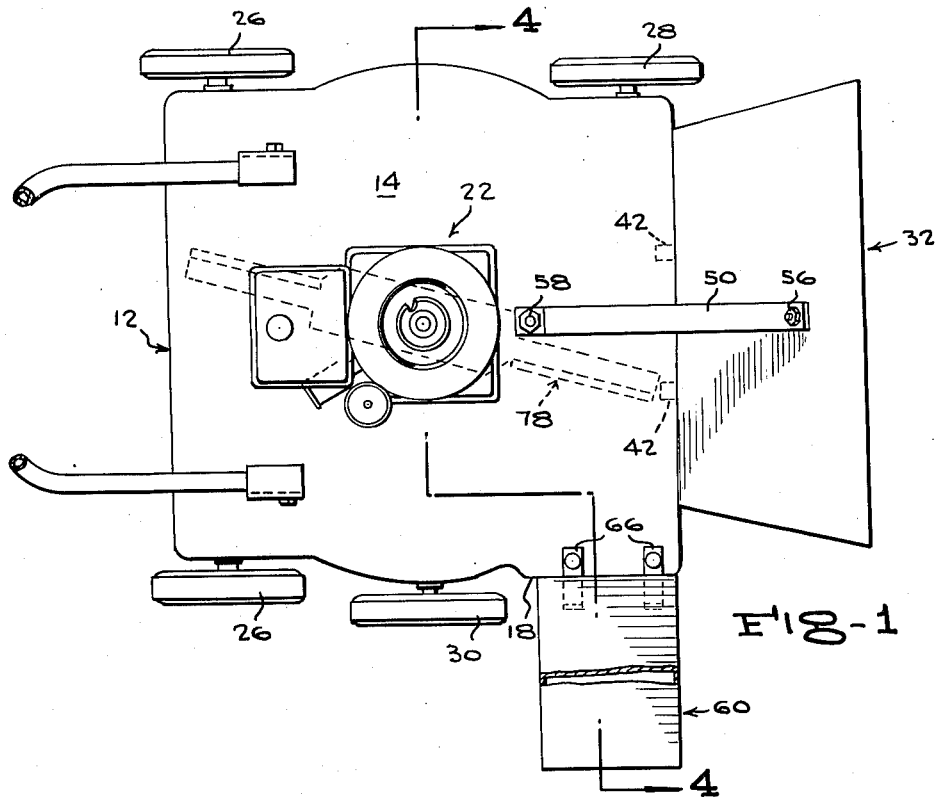
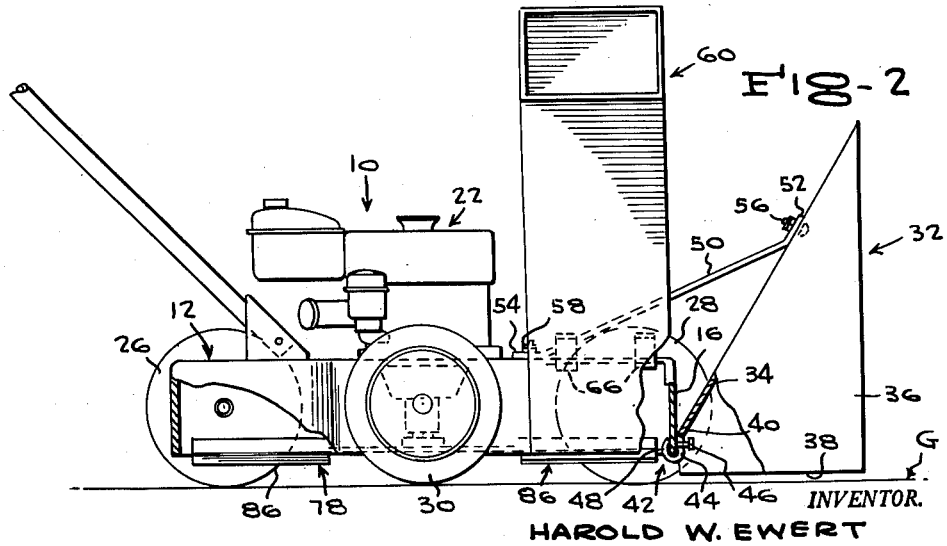
INVENTOR.
HAROLD W. EWERT
BY
McMorrow, Berman & Davidson
ATTORNEYS

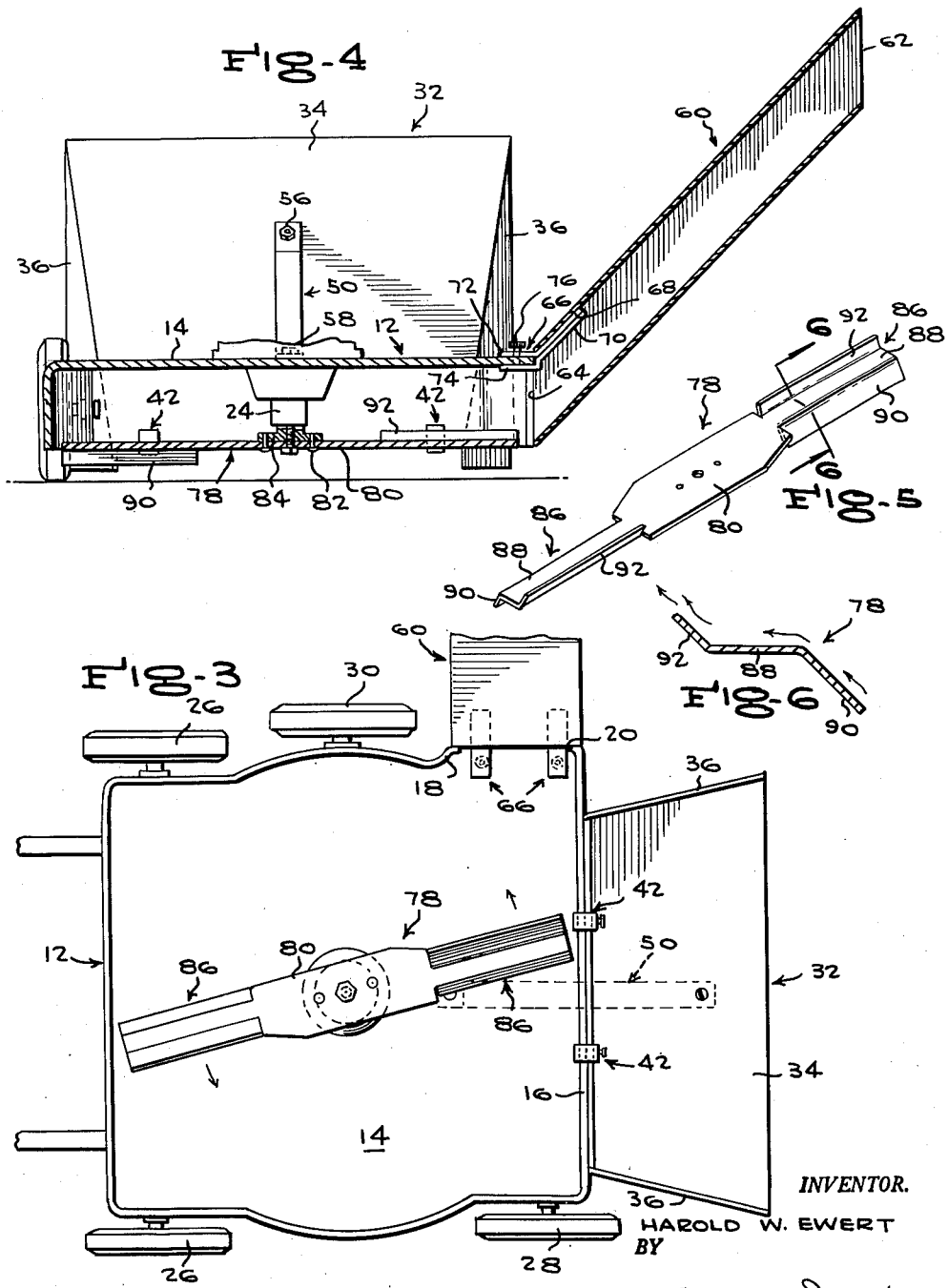

United States Patent Office 3,035,359
Patented May 22, 1962

3,035,359
SNOW REMOVING ATTACHMENT FOR
POWER MOWERS
Harold W. Ewert, 310 SE. 10th St., Newton, Kans.
Filed June 23, 1961, Ser. No. 119,073
10 Claims. (Cl. 37—43)

This invention relates to a snow removing attachment for power lawn mowers.

The primary object of the invention is the provision of an attachment of the kind indicated which is easily installed on a conventional power lawn mower, without special tools or equipment, and which converts the mower to an efficient and easily used power snow remover, especially useful for removing snow from walks, driveways, and like unobstructed and smooth surfaced areas.

A further object of the invention is the provision of an attachment of the character indicated above, which can be sold as a kit made up of a snow discharge chute to be installed on the side of a mower in registry with its grass discharge opening, a snow scoop to be installed on the front of the mower, to define the width of strip of snow to be removed and to force snow under the mower, and a special rotary blade to replace the existing cutter blade of the mower, the components of the kit being simple and inexpensive in construction.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a power mower equipped with an attachment of the present invention, partly broken away and in section;

FIGURE 2 is a right-hand side elevation of FIGURE 1, portions being broken away and in section;

FIGURE 3 is a fragmentary bottom plan view of FIGURE 1;

FIGURE 4 is a transverse vertical section taken on the line 4—4 of FIGURE 1;

FIGURE 5 is an enlarged and fragmentary perspective view of the special blade or rotor; and, FIGURE 6 is an enlarged transverse section taken on the line 6—6 of FIGURE 5.

Referring in detail to the drawings, wherein like numerals designate like parts throughout the several views, a conventional form of power lawn motor 10 is shown, which has a downwardly opening, generally rectangular pan-shaped housing 12, having a flat horizontal top wall 14, and a pendant skirt which includes a straight front wall 16, and a right-hand side wall 18, in a forward part of which a cut grass discharge opening 20 is provided. A motor 22 is mounted centrally upon the top wall 14 and has a downwardly extending shaft 24, journalled through the top wall, and on which the usual cutter rotor (not shown) is secured. The housing 12 is mounted on transversely aligned rear wheels 26, and staggered front wheels, which include a forward left-hand wheel 28 and a rearwardly displaced right-hand wheel 30.

In accordance with the present invention, a snow scoop 32 is mounted on the housing front wall 16 for gathering snow as the mower is moved forwardly, and forcing the gathered snow rearwardly, under the front wall 16, into the interior of the housing 12. The snow scoop 32 is triangular in vertical longitudinal section and is forwardly flared, and is composed of a forwardly and upwardly angled top wall 34, which is forwardly flared, as shown in FIGURE 1, and triangular side walls 36 extending along the side edges of the top wall 34, and being in forwardly divergent relationship. As shown in FIGURE 2, the lower edges 38 of the scoop side walls 36 reach below the lower edge 40 of the top wall 34 and run close to the ground G.

Attaching means for the scoop 32 comprises C-shaped brackets 42 spaced along and extending below the lower edge 40 of the top wall 34, for embracing the lower edge of the front wall 16 of the mower housing 12. The legs 44 of the brackets 42 which are fixed to the lower edge of the scoop top wall 40, have set screws 46 threaded therethrough, to engage the front wall 16 in opposition to the other legs 48 of the brackets. For bracing the scoop 32 in erect position, a rearwardly declining brace bar 50 is provided, which has appropriately angled forward and rear end portions 52 and 54, respectively, which conformably engage the rear surface of an upper part of the scoop top wall 40, and the upper surface of the mower housing top wall 14, and are secured thereto, as by means of bolts 56 and 58, respectively.

The attachment further comprises a tubular snow discharge chute 60, preferably of rectangular cross section, and having a bore of the same or a size larger than the dimensions of the cut grass discharge opening 20 in the right-hand mower housing side wall 18. The upper and lower ends of the chute 60 are bevelled, as indicated at 62 and 64, respectively. The bevelled lower end 64 of the chute, as shown in FIGURE 4, is disposed parallel to and engaged with the housing side wall 18, with the chute extending at an acute upward and laterally outward angle relative thereto.

Attaching means for the chute 60 spaced brackets 66 which comprise superimposed bars 68 and 70, which are suitably fixed together, the upper bar 68 being secured, as by welding, to the underside of the chute top wall. The upper bar 68 has a horizontal jaw 72 on its lower end, which extends rearwardly beyond the lower end of the chute top wall, to bear upon the upper surface of the housing top wall 14, at the discharge opening 20. The lower bar 70 has a rearwardly extending horizontal jaw 74, registered with and spaced from the upper jaw 72 to engage the underside of the housing top wall 14. A set screw 76 is threaded through the upper jaw 72, and bears upon the upper surface of the housing top wall 14, or can be threaded therein, so as to hold the chute 60 rigidly in place on the mower housing 12.

The uusal mower cutter rotor is replaced on the motor shaft 24 with a special blower rotor 78, which comprises a flat horizontal middle or center portion 80, adapted to be secured, as indicated at 82, to the flange 84 on the lower end of the shaft, and similar but reversed propeller end portions 86. As shown in FIGURE 6, the propeller end portions 86 comprise longitudinally elongated relatively narrow parallel sided or rectangular intermediate portions 88, which are located on the longitudinal centerline of the center portion 80, downwardly angled rectangular leading edge portions 90, and upwardly angled rectangular trailing edge portions 92. The leading and trailing edge portions are angled relative to the portions 88 at angles of about 45°. Further, the leading edge portions 90 are about twice as wide as the trailing edge portions 92, as shown in FIGURE 6.

The rotor 78 is, as indicated by arrows in FIGURE 3, rotated in the direction of the discharge opening 20 and the lower end of the snow discharge chute 60, and, as indicated by arrows in FIGURE 6, air within the mower housing is met by the leading edge portions 90 of the rotor and compressed upwardly and passed across the top of the intermediate portion 88, and is then further compressed upwardly by the trailing edge portions 92, whereby air is drawn into the mower housing, around its lower edge, and discharged out of the discharge opening 20, in such manner that snow, forced from the snow scoop 32 under the front wall 16 of the mower housing is sucked into the path of the rotating rotor 78, and, combined with air, is forced out of the discharge opening 20 and up through the chute 60, so as to be disposed of at the right-hand side of the mower, as the same is moved forwardly over snow covered ground.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction towards said discharge opening.

2. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said snow scoop comprising a forwardly inclined and forwardly flaring top wall, and triangular side walls extending along the side edges of the scoop top wall and being in forwardly divergent relationships.

3. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said snow scoop comprising a forwardly inclined and forwardly flaring top wall, and triangular side walls extending along the side edges of the scoop top wall and being in forwardly divergent relationships, and means removably mounting the scoop on said front wall.

4. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said snow scoop comprising a forwardly inclined and forwardly flaring top wall, and triangular side walls extending along the side edges of the scoop top wall and being in forwardly divergent relationships, and means removably mounting the scoop on said front wall, comprising C-shaped brackets on the lower edge of the scoop top wall embracing the lower edge of said front wall, said brackets having forward legs fixed to the scoop top wall and rear legs bearing against the rear side of the front wall, and set screws in the forward legs bearing against the forward side of the front wall.

5. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said snow scoop comprising a forwardly inclined and forwardly flaring top wall, and triangular side walls extending along the side edges of the scoop top wall and being in forwardly divergent relationships, and means removably mounting the scoop on said front wall, comprising C-shaped brackets on the lower edge of the scoop top wall embracing the lower edge of said front wall, said brackets having forward legs fixed to the scoop top wall and rear legs bearing against the rear side of the front wall, and set screws in the forward legs bearing against the forward side of the front wall, and a diagonal brace bar extending downwardly and rearwardly from an upper part of the scoop top wall, and removably secured at its ends to the scoop top wall and the mower housing top wall.

6. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said chute being of rectangular tubular form and having a bottom wall having a lower edge, and means removably mounting the chute on the housing top wall.

7. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall and extending upwardly and outwardly from said side wall, the chute having an open lower end registered with said discharge opening, and a blower rotor fixed on the motor shaft within the housing and rotating in a direction toward said discharge opening, said chute being of rectangular tubular form and having a bottom wall having a lower edge, and means removably mounting the chute on the housing top wall, comprising brackets fixed to the underside of the chute bottom wall and extending beyond its lower edge, said brackets having spaced upper and lower jaws, the lower jaw being engaged with the underside of the housing top wall through the discharge opening of the housing side wall, the upper jaw being at the upper side of the top wall, and set screws threaded through the upper jaws and bearing upon the upper side of the housing top wall.

8. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall, and extending upwardly and outwardly from said side wall, the chute having an open lower end registered with said discharge opening, and a blower rotor fixed on the motor shaft within the housing and rotating in a direction toward said discharge opening, said rotor comprising a flat horizontal center portion fixed to the lower end of the motor shaft, and reversed propeller portions extending from the ends of the center portion.

9. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall, and extending upwardly and outwardly from said side wall, the chute having an open lower end registered with said discharge opening, and a blower rotor fixed on the motor shaft within the housing and rotating in a direction toward said discharge opening, said rotor comprising a flat horizontal center portion fixed to the lower end of the motor shaft, and reversed propeller portions extending from the ends of the center portion, said propeller end portions comprising longitudinally elongated horizontal flat intermediate portions extending in the plane of the center portions, downwardly angled leading edge portions on one side edge of the intermediate portions, and upwardly angled trailing edge portions on the other side edge of the intermediate portions.

10. In combination, a power lawn mower having an inverted pan-shaped wheeled housing having a horizontal top wall, a transverse front wall, and a side wall provided in a forward part thereof with a discharge opening, a motor mounted upon said top wall having a shaft extending downwardly through the top wall, a snow scoop mounted on and extending forwardly from said front wall and having an open lower end on a level with the lower edge of the front wall, a lateral snow chute mounted on the housing top wall, and extending upwardly and outwardly from said side wall, the chute having an open lower end registered with said discharge opening, and a blower rotor fixed on the motor shaft within the housing and rotating in a direction toward said discharge opening, said rotor comprising a flat horizontal center portion fixed to the lower end of the motor shaft, and reversed propeller portions extending from the ends of the center portion, said propeller end portions comprising longitudinally elongated horizontal flat intermediate portions extending in the plane of the center portions, downwardly angled leading edge portions on one side edge of the intermediate portions, and upwardly angled trailing edge portions on the other side edge of the intermediate portions, the leading edge portions being wider than the trailing edge portions, and the leading edge portions and trailing edge portions being rectangular and extending the length of the intermediate portions.

References Cited in the file of this patent

UNITED STATES PATENTS

| | | |
|---|---|---|
| 2,695,071 | Hupp | Nov. 23, 1954 |
| 2,836,029 | Johnson | May 27, 1958 |
| 2,889,641 | Rechenberg | June 9, 1959 |
| 2,984,919 | Stoddard | May 23, 1961 |